United States Patent [19]

Aoi et al.

[11] Patent Number: 4,530,080
[45] Date of Patent: Jul. 16, 1985

[54] OPTICAL RECORDING/REPRODUCING SYSTEM

[75] Inventors: Toshiki Aoi; Shiro Nakagawa, both of Tokyo, Japan

[73] Assignee: TDK Electronics Co., Ltd., Tokyo, Japan

[21] Appl. No.: 362,983

[22] Filed: Mar. 29, 1982

[30] Foreign Application Priority Data

Apr. 7, 1981 [JP] Japan .................................. 56-51161
Apr. 17, 1981 [JP] Japan .................................. 56-57126
Apr. 20, 1981 [JP] Japan .................................. 56-58622

[51] Int. Cl.³ .............................................. G11B 7/00
[52] U.S. Cl. ..................................... 369/45; 250/201; 346/76 L
[58] Field of Search ............... 346/76 L; 369/45, 100, 369/109, 111, 121, 122, 275, 284, 44; 250/201, 201 DF, 201 R

[56] References Cited

U.S. PATENT DOCUMENTS

| 3,902,010 | 8/1975 | Goshima | 358/342 |
| 3,932,700 | 1/1976 | Snopko | 369/45 |
| 3,969,575 | 7/1976 | Gerritsen | 369/45 |
| 4,383,261 | 5/1983 | Goldberg | 346/76 L |
| 4,399,529 | 8/1983 | Leterme | 369/122 |

Primary Examiner—Alan Faber
Attorney, Agent, or Firm—Collard, Roe & Galgano

[57] ABSTRACT

A simple heat mode optical recording system uses a laser beam comprised of a first laser beam and a second laser beam. The energy density of each beam is less than the threshold level for effecting the recording data on a recording medium, but the sum of the energy density of the two beams exceeds the threshold level. The second beam functions to pre-heat the recording medium, and is implemented by a powerful inexpensive LED laser, and the first beam functions to write and/or read data and has a sharp area to increase the storage capacity. Those two beams are focused on the recording medium by using a single focusing control means.

6 Claims, 9 Drawing Figures

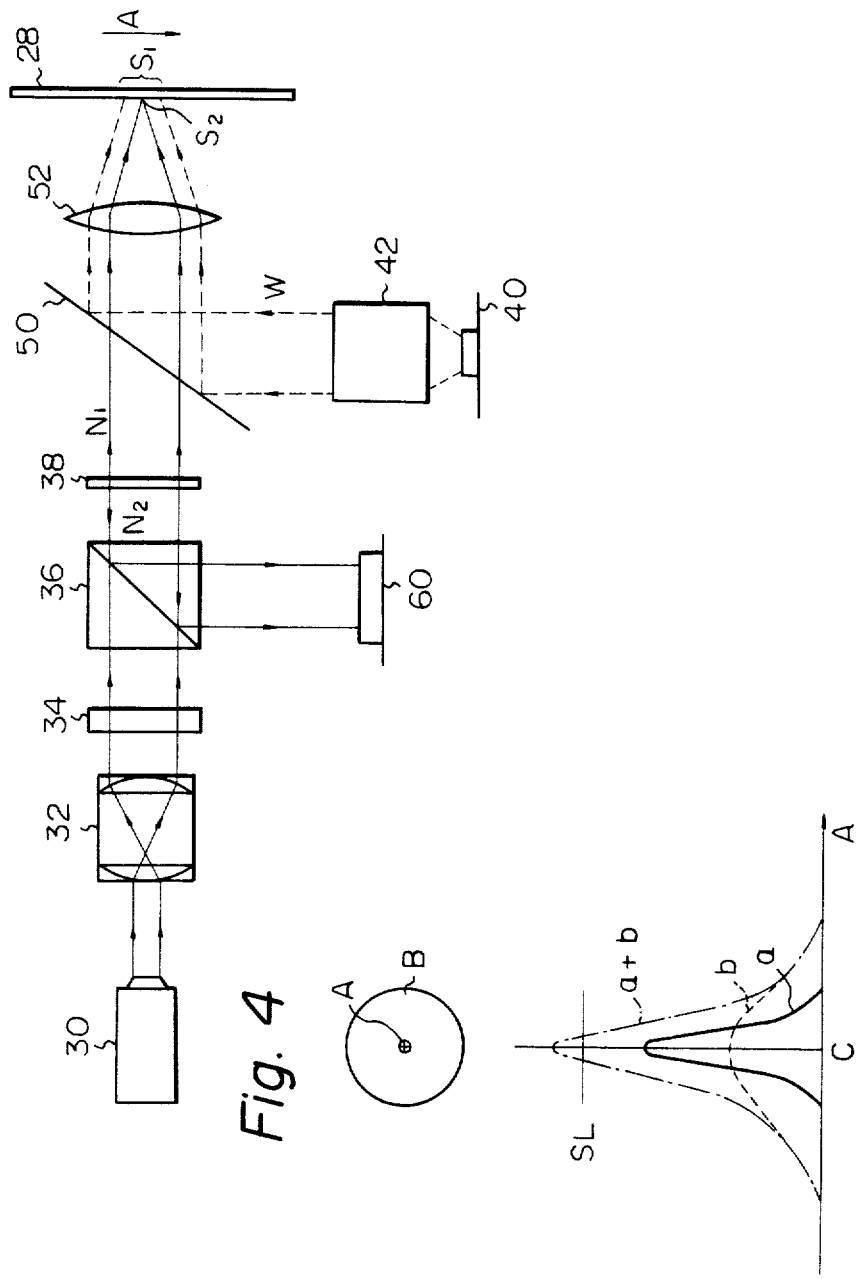

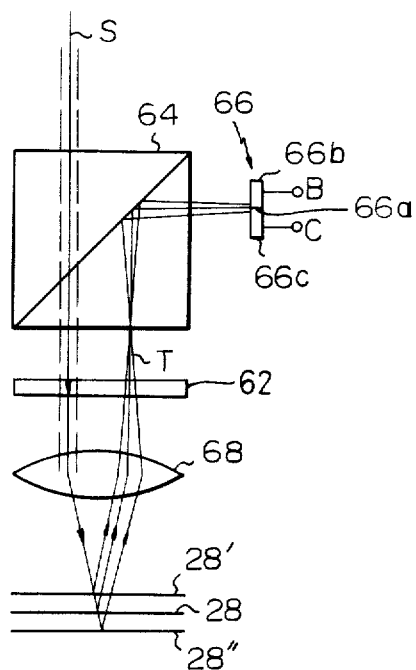
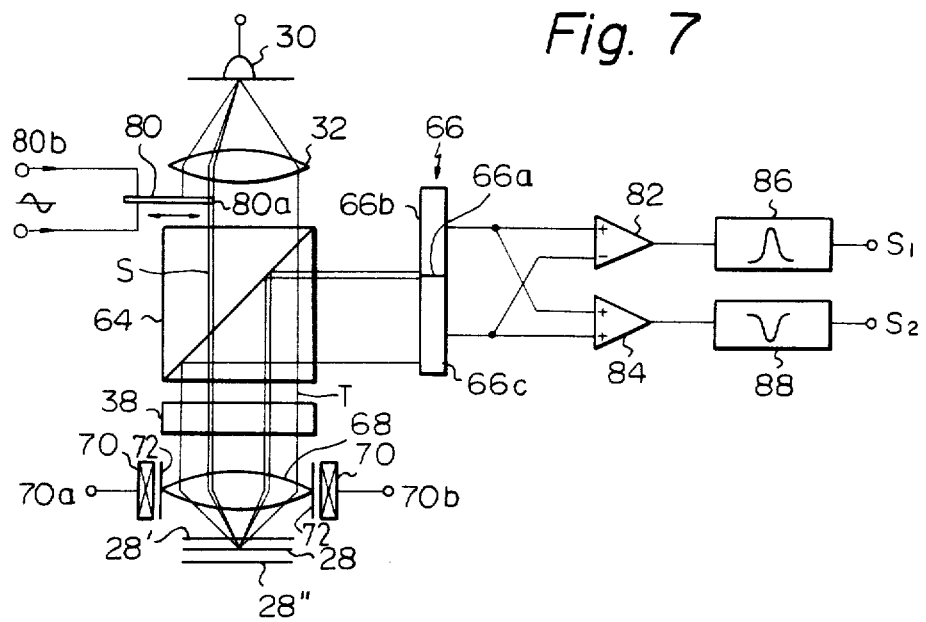

OPTICAL RECORDING/REPRODUCING SYSTEM

BACKGROUND OF THE INVENTION

The present invention relates to a heat mode optical recording/reproducing system using two laser beams and, in particular, it relates to such a system which uses a simple focusing system.

A heat mode optical recording system uses a recording medium which stores data through the physical change of the medium in high temperature. There have been known at least three heat mode recording mediums. One of them is a heat meltable plastic, like styrene. In this case, data is stored by producing a pit on a medum by melting the same by a laser beam, and a plastic medium has the advantage that an erasable recording is possible like a conventional magnetic recording. Another heat mode recording system uses a recording medium which is selectively burnt when illuminated by a laser beam, and a small hole is obtained. That small hole corresponds to each stored data. Still another heat mode recording medium changes the reflection coefficient or the optical transmission coefficient, and transparent portion and opaque portion relates to data 0 and 1.

The present invention may be applied to all of above recording mediums. And for the simplicity of the explanation, erasable medium using plastic is mainly explained in the following description.

Plastics having as a main component styrene ore melted at high temperature. When that meltable plastic is used as a memory medium, data is stored in that medium by illuminating the surface of the plastic with a thin laser beam to provide a pit on the surface of the same. Thus, the presence of a pit shows that the data "1" is stored, and the non-existance of a pit shows that the data "0" is stored. That data stored in the plastic is read out by illuminating the surface of the same with a weak laser beam, which reflects irregularly at a pit, and then, the presence of a read-out laser beam can indicate whether the data stored in the plastic is "1" or "0".

The data thus stored is erased by melting the surface selectively by illuminating the same with a thick and strong laser beam, and cancelling a pit. When a pit is cancelled, new data can be stored again at that portion where a pit existed. Therefore, meltable plastic is an erasable optical memory medium, which can store data repetitively, like a conventional magnetic recording medium.

In order to melt the surface of a plastic, a thin and strong laser beam is necessary, and that beam must have enough energy density to melt the surface. Further, a laser beam must be thin enough (for instance, the diameter of a laser beam is 1 $\mu$m) for providing thick data density to increase the storage capacity of the memory. When the diameter of a laser beam is 1 $\mu$m, the diameter of a pit is also approximately 1 $\mu$m.

When data is erased by cancelling a pit, the stronger laser beam is necessary to melt not only a pit itself but also a peripheral portion of a pit, thus, the diameter of a laser beam for erasing data must be three times as thick as that of a pit, and a laser beam with extremely high power density is required.

However, that high power laser apparatus is very expensive.

Further, a laser beam must be focused accurately on the surface of a plastic, and a prior focusing system is not complete.

SUMMARY OF THE INVENTION

It is an object, therefore, of the present invention to overcome the disadvantages and limitations of a prior optical recording/reproducing system by providing a new and improved optical recording/reproducing system.

It is also an object of the present invention to provide an optical recording/reproducing system in which laser power for storing/erasing data is not so high.

The above and other objects are attained by an optical recording/reproducing system for recording and/or reproducing data on a heat mode recording medium having (a) a first laser beam source for providing a first laser beam, (b) modulation means for modulating the intensity of the first beam, (c) separation means which passes the first beam from said first beam source but separates a reflection beam in the opposite direction of the first beam, (d) means for converting optical energy to electrical energy to provide a reproduced signal according to the separated reflection beam from said separation means, (e) a second beam source for providing a second laser beam, (f) combining means for combining the first beam and the second beam, (g) focusing lens for focusing the combined first beam and the second beam on the surface of the recording medium, (h) focusing lens adjusting means for having said focusing lens focus the beams on the recording medium, (i) an energy density of said first beam and an energy density of said second beam being less than threshold level for effecting the recording on the medium, and sum of the energy density of the first beam and the second beam exceeding said threshold level for effecting the recording on the medium, and (j) the second beam illuminating a wider area of the surface of the recording medium than the first beam does.

BRIEF DESCRIPTION OF THE DRAWINGS

The foregoing and other objects, features, and attendant advantages of the present invention will be appreciated as the same become better understood by means of the following description and accompanying drawings wherein:

FIG. 3 is the diagram of the present optical recording system, FIG. 4 shows the explanatory drawing of the operation of the system of FIG. 3, FIG. 6 shows the principle for focusing a laser beam in FIG. 5, and FIG. 7 shows another diagram for focusing a laser beam according to the present invention.

DESCRIPTION OF THE PREFERRED EMBODIMENTS

An erasable optical recording is described in accordance with FIG. 1 and FIGS. 2A through 2C, first.

Figure 1:
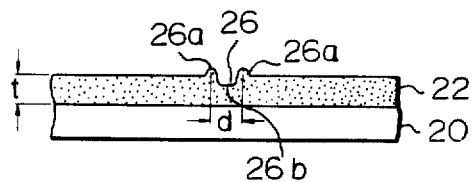
FIG. 1 shows an erasable recording medium for the explanation of the present invention.

FIG. 1 shows the structure of an erasable optical recording medium, which can be implemented for instance by a plastic having the main component of styrene. In FIG. 1, the reference numeral 20 shows a substrate which is for instance acrylic resin or glass, 22 is a thin film of a plastic recording medium which is composed of a plastic with the main component styrene. Preferably, that recording medium is styreneoligomer which includes some dye (for instance "Oleosol first blue EL"), for absorbing optical energy sufficiently.

When the surface of that recording medium is heated selectively with a laser beam, the heated portion is melted and a pit is produced. A pit is shaped as shown by the reference numeral 26 having a ring-shaped circumferential bank 26a, and a circular flat portion 26b surrounded by the ring 26a, because of the surface tension effect of the melted liquid and the flow of said liquid outside of a pit. That concaved pit corresponds to the data "1", and the non-existence of a pit corresponds to a data "0".

In order to facilitate the reproduction of a pit, or an erasable recording, a thin plastic film 26b must exist at the bottom of a pit, that is to say, the substrate 20 must not be exposed in air at the portion of a pit. In order to assure that the substrate 20 is covered with a plastic film at the portion of a pit, the thickness (t) of the recording medium 22 must be greater than the diameter (d) of a pit, and preferably, that thickness (t) is greater than 3 μm. It should be appreciated that the heat conductivity of a styrene polymerization product with low degree is small, and therefore, a pit can be produced with a relatively low energy density even when the thickness (t) of the medium 22 is large.

If the thickness (t) is less than the above value, the affinity between the substrate and the recording medium must be greater than the surface tension of the melted recording medium, in order to assure that the substrate 20 is not exposed to air at the bottom of a pit. The preferable combination of the substrate and the recording medium for satisfying the above condition is that the recording medium is styrene-oligomer, and the substrate is acrylic resin or glass. If the above condition is satisfied, the bottom of a pit does not expose the substrate to air even when the recording medium is melted up to the bottom of the pit, since the substrate is wet by the melted recording medium, and when the ring 26a is melted afterwards, the pit is cancelled for the next recording. If the above condition is not satisfied, the melted recording medium is shaped like a ball by the surface tension effect, and a pit can not be cancelled, thus, an erasable recording is impossible.

The data stored in a pit is read out by illuminating the surface of the recording medium with a weak laser beam, and detected by the reflected beam from the surface. When no pit exists, no irregular reflection occurs, and therefore, the incident angle of an input beam is equal to that of an output beam, then, a photo-detector positioned in the incident angle of the output beam can only detect a beam. On the other hand, when a pit exists, an irregular reflection occurs, and the photo-detector does not detect a beam. Thus, a photo-detector can provide output data.

Figure 2A:
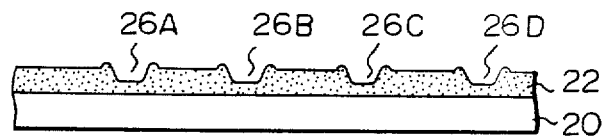
FIGS. 2A through 2C show the operation of the erasable recording medium of FIG. 1.
Figure 2B:
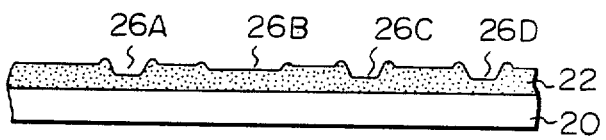
Figure 2C:
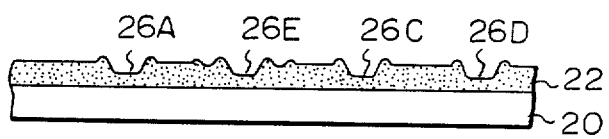

The recording, reading and erasing of data is described more in detail in accordance with FIGS. 2A through 2C.

The recording is accomplished by illuminating the surface of the recording medium with a laser beam having the diameter of 1–2 μm (for instance, the power of that laser beam is 5 mW), and produces pits 26A, 26B, 26C, 26D (see FIG. 2A).

The erasing or cancellation of data is accomplished by illuminating a pit and its peripheral portion with a laser beam or an LED beam (light emission diode beam). It is supposed that the diameter of a beam for erasing data is three times as large as that of a pit. When a plastic is heated by that beam, the recording medium is melted, and a pit is cancelled and is filled with melted plastic. The reference numeral 26B' in FIG. 2B shows an erased pit.

When the erased portion is illuminated again by a laser beam with the diameter of 1–2 μm, a pit is generated again and new data is stored. The reference numeral 26E in FIG. 2C shows a new pit.

Since the cancellation and/or the regeneration of a pit are repeated, an erasable optical recording is accomplished by using a plastic, as a conventional magnetic recording system does. Further, an optical recording has the advantages of high recording density and low noise.

FIG. 3 shows the structure of the optical recording system according to the present invention. In the figure, the reference numeral 28 is an optical recording medium described in accordance with FIG. 1, and that medium moves along the arrow A. The reference numeral 30 is a He-Ne laser (helium-neon laser), 32 is a collimate lens, 34 is an optical modulator for providing an intensity modulation to the beam according to the data to be stored, 36 is a beam splitter, which passes the original beam but splits the reflection beam in the opposite direction, 38 is a quarter wavelength plate having the thickness of ¼ wavelength of a beam of a laser, 40 is a light emission diode (LED), 42 is a collimate lens, 50 is a dichroic mirror, which passes the wavelength of the first laser source 30 and reflects the wavelength of the second laser source 40, 52 is a focus lens, and 60 is a photo-detector for converting optical energy to an electrical energy.

The operation of the apparatus of FIG. 3 is now described.

The light beam W generated by the light emission diode 40 is collimated by the lens 42, and illuminates the relatively wide area $S_1$ on the medium 28, through the dichroic mirror 50 and the lens 52. The diameter of the area $S_1$ is supposed to be greater than 3 μm, and preferably that diameter is for instance 10 μm. The beam on the area $S_1$ functions to pre-heat the medium 28.

On the other hand, the light beam generated by the He-Ne laser 30 is collimated by the lens 32, and the intensity of the beam is modulated by the optical modulator 34 according to the information to be recorded. The modulation is the amplitude modulation or the intensity modulation. The output beam $N_1$ of the optical modulator 34 illuminates the small area $S_2$ (for instance, the diameter of the area $S_2$ is 1 μm) on the medium 28 through the beam splitter 36, the quarter wavelength plate 38, the dichroic mirror 50 and the lens 52. The dichroic mirror 50 and the lens 52 are arranged so that the area $S_2$ illuminated by the laser 30 is superposed on the area $S_1$ which is illuminated by the light emission diode 40.

It is supposed that the beam energy by the light emission diode 40 distributes in wide area as shown by the curve (b) of FIG. 4, and the highest energy density by the light emission diode 40 is less than the threshold level SL for melting the surface of the medium 28. And it is supposed that the beam energy of the laser 30 distributes in narrow area as shown by the curve (a) of FIG. 4, and the highest energy density of the laser 30 is also less than the threshold level SL. When the two beams are superposed, the total energy density is (a+b) as shown in FIG. 4, and the highest energy density of the curve (a+b) exceeds the threshold level SL for melting the medium 28. Accordingly, the relatively wide area $S_1$ on the medium 28 is pre-heated with the low energy density, and the area $S_2$ at the center of the area $S_1$ is illuminated with the high energy density, and the medium in the area $S_1$ is melted. Preferably, the diameter of the area $S_1$ is approximately 1 μm for recording a new data, and the diameter of the area $S_2$ in case of erasing is approximately 3 μm. Preferably, the energy density of the light emission diode 40 is 50% of the threshold level SL for melting, and the rest of 50% of the energy is supplied by the laser 30.

When the data on the medium 28 is read out, the light emission diode 40 is turned OFF, and the output of the laser 30 is weakened. The weakened beam from the laser 30 illuminates the medium 28, which reflects the beam. The reflected beam reaches the photo-detector 60 through the reflection by the beam splitter 36. Thus, the photo-detector 60 can recognize whether or not a pit exists on the medium 28.

In the above embodiment, the quarter wavelength plate 38 functions to convert the input wave to circular polarization. It should be noted that the reflection beam in reading out the data passes that quarter wavelength plate 38 twice, and then, the total rotation of the plane of polarization is 90°. Therefore, the reflection beam $N_2$ is reflected by the beam splitter 36 and the reflection beam $N_2$ reaches the photo-detector 60.

As explained above, the embodiment of FIG. 3 has the feature of the pre-heat by the light emission diode 40, which is less expensive as compared with the laser 30. Therefore, the output power of the laser 30 may be small. In particular, the high power is requested in erasing data, and the output power of the laser 30 would be high if the second light source 40 did not exist. Because of the presence of the light emission diode 40 for pre-heating, a relatively small laser 30 can function for both reducing data and cancelling the same. Further, the optical power source for pre-heating may be a light emission diode, which is less expensive as compared with a laser, since the beam for pre-heating illuminates the relatively wide area, and does not request a sharp focusing as compared with a laser beam for recording data.

In the modification, it should be appreciated that a semiconductor laser may replace a He-Ne laser 30. In that case, an optical modulator 34 may be removed, and instead, a semiconductor laser doubles as a modulator by modulating a data directly in the emission of a laser beam.

Figure 5:
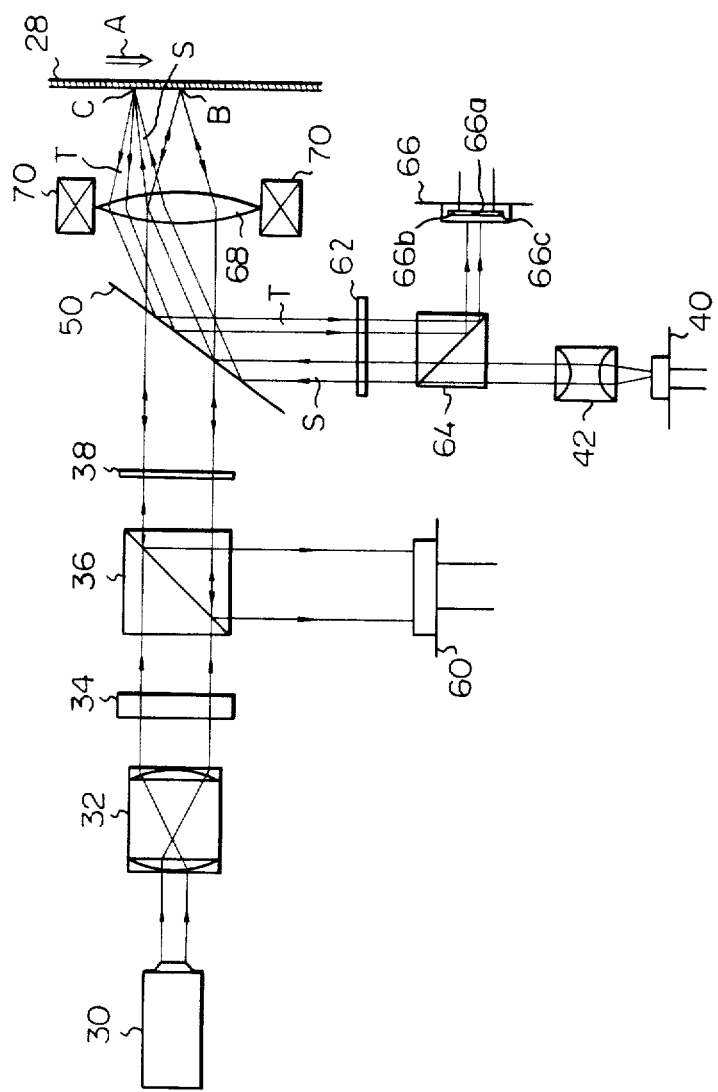
FIG. 5 is another embodiment of the optical recording system according to the present invention.

FIG. 5 shows the block diagram of another embodiment according to the present invention, and the feature of the embodiment of FIG. 5 resides in the structure for focusing the laser beams. The same reference numerals as those of FIG. 3 show the same member, and the reference numeral 30 is a He-Ne laser, 32 is a collimate lens for providing the parallel beam, 34 is an optical modulator for providing an amplitude modulation of a laser beam according to the data to be recorded, 36 is a beam splitter which passes a polarization which vibrates in the path of the beam, but prevents a polarization which vibrates in the lateral direction of the laser beam path. The reference numeral 38 is a ¼ wavelength plate for providing a circular polarization. The reference numeral 40 is the second laser source which is implemented by a LED (light emission diode) for providing a powerful laser beam, 42 is a collimate lens, 50 is a dichroic mirror which passes the predetermined wavelength but prevents other wavelengths. In the embodiment, the dichroic mirror 50 passes the wavelength of the first laser 30 but prevents the wavelength of the second laser 40. The reference numeral 60 is a photo-detector for receiving a reflection beam from the beam splitter 36 to reproduce read-out data, 62 is another ¼ wavelength plate, 64 is another beam splitter, 66 is the photo-diode pair having a pair of photo-diodes 66b and 66c which are positioned in the opposite portion of the border line 66a between the two photo-diodes 66b and 66c. The reference numeral 68 is a focus lens for focusing the beams from the laser 30 and the laser 40. The reference numeral 70 is a winding which adjusts magnetically the focus lens 68 according to the output of the photo-diode pair 66. For the magnetical shift of the lens 68, a magnetic member (not shown) is fixed at the edge of the lens 68.

It should be appreciated that a laser beam from the first laser 30 passes the center of the lens, while a laser beam from the second laser 40 passes the peripheral portion of the lens 68. That feature that the second beam passes the peripheral portion of the lens 68 is important for focusing the lens 68 and the pre-heating of the recording medium.

The operational principle of the focusing of FIG. 5 is described in accordance with FIG. 6. The input laser beam S passes the focusing lens 68 apart from the optical axis of the lens 68 through the beam splitter 64, and then, illuminates the recording medium 28. The reflection beam T from the recording medium 28 passes apart from the optical axis of the lens 68, and the reflection beam T is reflected by the beam splitter 64 and that reflection beam illuminates the photo-detector pair 66, which has a pair of photo-detectors 66b and 66c separated by the border 66a.

When the recording medium 28 is positioned at the focal point of the lens 68, that reflection beam T illuminates just the border 66a. When the recording medium 28 is a little close to the lens 68 and is positioned at the line 28', the reflection beam T illuminates the upper photo-detector 66b. On the other hand, when the recording medium 28 is positioned at the line 28'', then, the reflection beam T illuminates the lower photo-diode 66c. The outputs B and C of the photo-detectors 66b and 66c are applied to a differential amplifier (not shown), which provides the signal indicating the focal point of the beam. Of course, when the recording medium 28 is positioned at the focal point of the lens 68, the output of the photo-detector 66b and 66c is balanced, and the output of the differential amplifier is zero. When the recording medium 28 is out of focus, the differential amplifier provides the output signal according to the error from the focal point.

The operation of the apparatus of FIG. 5 is as follows.

The adjustment of the focus lens 68 is accomplished through the use of the second laser beam from the laser 40. The laser beam generated by the laser 40 is collimated by the collimate lens 42 which provides the parallel beam, and the beam splitter 64 provides the linear polarization, then, the ¼ wavelength plate provides the circular polarization. The output of the ¼ wavelength plate 62 is reflected by the dichroic mirror 50 which reflects the wavelength of the second laser 40, and the output of the dichroic mirror 50 focuses on the point C through the focusing lens 68. The point C resides on the recording medium 28, and is positioned the upstream side of the point B where an optical recording is accomplished. That is to say, since the recording medium 28 moves in the direction of the arrow A, the recording medium 28 passes first the point C, and next, passes the point B.

The beam is then reflected by the recording medium 28 at the point C, and the reflected beam is reflected by the dichroic mirror 50, and the ¼ wavelength plate 62 converts the circular polarization to the linear polarization, which is perpendicular to the linear polarization of the original input laser beam from the source 40. Then, the output beam of the beam splitter 64 is received by the photo-detector 66, and each of the diodes 66b and 66c provide the electrical outputs. When an optical signal by an LED is not a strict linear polarization, only linear polarization component is separated by the beam splitter 62, and that separated portion is enough for focusing.

When the recording medium 28 is shifted from the focal point B, and out of focus, the reflection beam from the recording medium 28 passes the peripheral portion of the lens 68, then, the center of the reflection beam is shifted to the upper direction of the figure, and the center of the reflection beam illuminates the photo-diode 66b, therefore, the upper photo-diode 66b provides the higher output voltage, and the lower photo-diode 66c provides the lower output voltage. On the other hand, when the recording medium 28 is slightly shifted to the left direction of the figure, the upper photo-diode 66b provides the lower output voltage, and the lower photo-diode 66c provides the higher output voltage. The outputs of those two photo-diodes 66b and 66c are applied to a differential amplifier (not shown), which provides the output signal indicating the direction and the magnitude of the error of the focal point. That output signal of the differential amplifier is applied to the winding 70, which adjusts the focusing lens 68.

In the recording phase, the laser beam from the second laser 40 is focused on the point C as described before, and that laser beam pre-heats the recording medium 28 beforehand, and the point C is positioned upstream of the point B. The first laser beam from the laser 30, having the recording data information, is focused on the point B. The focusing of the recording laser beam from the laser 30 is also effected by the lens 68, which is adjusted using the above described laser beam 40. The laser beam of the laser 30 is collimated by the lens 32, and is modulated by the optical modulator 34, then, the beam passes the beam splitter 36, then, the beam is converted to the circular polarization by the ¼ wavelength plate 38. Next, the beam passes the dichroic mirror 50, which passes the wavelength of the laser 30, then, that laser beam is focused on the point B to melt the recording medium 28 selectively according to the data to be recorded.

It should be appreciated in FIG. 5, that the lens 68 is adjusted according to the reflection beam on the point C which is flat and has not recorded data. Therefore, the reflection beam at the point C has no noise caused by the recorded data, and the S/N (signal to noise ratio) of the reflection signal is excellent. Thus, the lens 68 is adjusted very accurately.

Further, it should be noted in FIG. 5 that the beam from the laser 40 pre-heats the recording medium 28 beforehand, and therefore, the power of the recording laser 30 may be small, as described before in accordance with FIG. 4. Since the laser 40 is used just for the pre-heating and the adjustment of the focus, the coherency requested to the laser 40 is not severe, and therefore, the laser 40 may be a less expensive light emission diode.

In the re-producing phase, the laser 40 also effects adjusting of the focusing lens 68, and the power of the first laser 30 is weakened. The weakened laser beam from the laser 30 illuminates the point B, where the beam reflects according to the presence of a pit. The reflected beam passes through the lens 68, the dichroic mirror 50, and the ¼ wavelength plate 38 which converts the beam from the circular beam to the liner beam the polarization of which is perpendicular to that of the input beam. Then, the beam splitter 36 reflects the reflection beam to the photo-detector 60, which provides the reproduced electrical signal. That electrical signal from the photo-detector 60 has the information of the presence of a pit.

It should be appreciated that the focus area at the point C by the second laser 40 is rather large as compared with the area of a pit which is produced by the first laser 30. Therefore, the precise adjustment of the focusing lens 68 is accomplished irrespective of the irregular reflection by the pits.

In the erasing phase, the first laser 30 is turned OFF, and the power of the second laser 40 is increased, so that the power exceeds the threshold level. Alternatively, instead of turning OFF the first laser 30, it is also possible to superpose the first laser beam power and the second laser beam power so that the superposed power of the laser beams exceeds the threshold level of the recording medium 28 as is the case of recording phase. In an erasing phase, it is supposed that the beam spot of the point B is larger than the diameter of a pit so that a pit is completely deleted. It should be noted also that the adjustment of the focusing lens 68 is accomplished accurately since the beam on the point C is larger than a pit, and that beam is not disturbed by a pit.

As described above, the embodiment of FIG. 5 has the feature that the adjustment of the focusing lens is accomplished according to the second laser beam 40 which illuminates the point C on the upstream of the recording/reproducing point B with relatively large spot. Therefore, the focusing is effected without the effect of the presence of a pit, and therefore, the accurate and precise focusing is accomplished. Further, the beam for focusing doubles as the means for pre-heating, and therefore, the power of the recording laser 30 may be small.

FIG. 7 shows the diagram for focusing a laser beam on a recording medium according to the present invention. The feature of FIG. 7 is that a single beam at the center of a focusing lens is enough for focusing a laser beam, while the embodiment of FIG. 5 needs two beams, one of which passes apart from an optical axis of a focusing lens. Therefore, the embodiment of FIG. 7 may be used to focus the LED beam from the laser 40 which is superposed on the center of the laser beam from the laser 30 in the embodiment of FIG. 3.

The embodiment of FIG. 7 establishes the focusing by using a vibration chip 80 which vibrates an optical beam apart from the optical axis of the lens 68, and that vibrated optical beam functions as the second beam in the embodiment of FIG. 5.

In FIG. 7, the reference numeral 30 is a laser, 32 is a collimate lens for providing a parallel beam. The reference numeral 80 is a vibration chip, which is implemented by a piezo-electric ceramic to which alternative voltage from the terminal 80b is applied. That vibration chip 80 is inserted in the optical path of the parallel beam out of the collimate lens 32, and is vibrated in the direction indicated by the arrow V. Therefore, the edge 80a of the chip 80 functions as a gate for a beam, and then, the beam is amplitude-modulated or switched by the vibration of the chip 80. It should be noted that the modulated beam is very thin, and is positioned apart from the optical axis of the beam, therefore, that modulated beam functions as the second beam of the embodiment of FIG. 5, as far as a focusing of a beam is concerned.

The reference numeral 64 is a beam-splitter, which passes a polarization vibrating in the axis direction but prevents a polarization vibrating in the lateral direction of the optical axis, and provides the linear polarization. The reference numeral 38 is a ¼ wavelength plate for providing a circular polarization, 68 is a focusing lens, 28 is a recording medium. The recording medium is positioned just at the focal point of the lens 68 at the line 28, the line 28' shows the status that the medium is positioned nearer the lens 68, and the line 28'' shows that the medium is positioned farther than the focal point from the lens 68.

The reference numeral 66 is a photo-detector pair, having the pair of photo-detectors 66b and 66c in the opposite direction of the border 66a. The border 66a is positioned so that the modulated beam illuminates that border 66a when the recording medium 28 is just at the focal point. The photo-detectors 66b and 66c convert the optical beam into the electrical signal which is applied to the differential amplifiers 82 and 84. The amplifier 82 provides the difference between the outputs of the photo-detectors 66b and 66c, and the other amplifier 84 provides the sum of said outputs. The reference numerals 86 and 88 are a bandpass filter, the former filter 86 derives only the modulation component of the signal to provide the signal $S_1$ for the focus control, and the other bandpass filter 88 provides the reproduced signal $S_2$ of the recorded data. Those bandpass filters 86 and 88 can be replaced by another means having the similar function, for instance, an orthogonal synchronized detector.

The reference numeral 70 is a coil which receives the control signal from the output of said bandpass filter 86 for the focus control purpose, 72 is a ferro-magnetic chip fixed to the lens 68. The lens 68 and the chip 72 are supported in the coil 70 so that the electrical current flowing in the coil 70 adjusts the position of the lens 68 to provide the fine adjustment of the focal point of the lens 68.

When a side portion of a laser beam is amplitude modulated by the vibration chip 80, the modulated beam which is apart from the optical axis of the beam, passes the lens 68, and then is reflected by the recording medium 28. The reflected modulation beam T is separated from the input beam by the beam splitter 64, since the polarization of the reflection beam rotates by 90° with respect to that of the input beam, and then, that reflected modulation beam illuminates the photo-diode pair 66. As the modulated beam passes apart from the optical axis, that modulated beam illuminates either the photo-diode 66b or the photo-diode 66c according to the position of the recording medium, as described in accordance with FIG. 6. Therefore, the differential amplifier 82 provides the signal for controlling the lens 68 to provide the correct positioning of the lens 68. The bandpass filter 86 functions to derive only the modulation component of the optical signal. Therefore, the center frequency of the bandpass filter 86 is the same as the vibration frequency of the chip 80.

It should be appreciated that the size of the chip 80 is very small as compared with the diameter of the beam, and the energy density at the peripheral portion of the beam is small as compared with that of the central portion of a beam, therefore, the power of the beam for illuminating the recording medium 28 is not decreased by the presence of the chip 80 in the optical path. Thus, the beam illuminates the recording medium enough for pre-heating, and/or recording, re-producing, or cancelling data.

The filter 88 functions to delete the vibration frequency component of the chip 80 from the reproduction signal.

The focusing by the lens 68 is possible even when the recording medium vibrates up to 200 Hz.

Some alternatives for modulating the optical beam may be possible. For instance, a transparent PLZT crystal in which the refraction index depends upon the electrical field, may be inserted in an optical path, instead of said chip 80.

From the foregoing it will now be apparent that a new and improved optical recording system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical recording/reproducing system for recording/reproducing data on a heat mode recording medium comprising:
    (a) a first beam source for providing a first beam,
    (b) modulation means for modulating the intensity of the first beam from said first beam source,
    (c) separation means which passes the first beam from said first beam source but separates a reflection beam in the opposite direction of the first beam,
    (d) means for converting optical energy to electrical energy to provide a reproduced signal according to the separated reflection beam from said separation means,
    (e) a second beam source for providing a second beam,
    (f) combining means for combining the first beam and the second beam,
    (g) focusing lens for focusing both the first beam and the second beam on the surface of the recording medium,
    (h) focusing lens adjusting means for having said focusing lens focus the beams on the recording medium,
    (i) the energy density of said first beam and the energy density of said second beam each being less than threshold level for effecting recording on the medium, and the sum of the energy density of the first beam and the second beam exceeding said threshold level for effecting the recording on said medium,
    (j) the second beam illuminating a wider area of the surface of the recording medium than the first beam, and
    (k) said second beam illuminating an upstream portion of the recording medium, so that each portion of the recording medium is first illuminated by the second beam, and next illuminated by the first beam.

2. An optical recording/reproducing system according to claim 1, wherein a wavelength of the first beam is different from a wavelength of the second beam, and said combining means for combining the first beam and the second beam is a dichroic mirror.

3. An optical recording/reproducing system according to claim 1, wherein said focusing lens adjusting means has a photo-diode pair with a pair of photo-diodes which are positioned so that a reflection beam of the second beam illuminates just the border of those diodes when the first and the second beams are focused on the recording medium, and said reflection beam illuminates either a first diode or a second diode of said diode pair when the beams are in off-focus status, and said focusing lens is positioned according to the outputs of said diode pair in order to focus the two beams on the recording medium.

4. An optical recording/reproducing system according to claim 1, wherein a vibration plate is inserted in the peripheral portion in the second beam to provide an intensity modulation to some portion of the second beam, said focusing lens adjusting means has a photo-diode pair with a pair of photo-diodes which are positioned so that a reflection beam of the modulated portion of the second beam illuminates just the border of those diodes when the first and the second beams are focused on the recording medium, and said modulated portion illuminates either a first diode or a second diode of said diode pair when the beams are in off-focus status, a differential amplifier and means for deriving the particular frequency are provided to provide the difference between the outputs of the diode pair and to derive only the modulation frequency which is the same as the vibration frequency of said vibration plate, and said focusing lens is positioned according to the output of the bandpass filter in order to focus the two beams on the recording medium.

5. An optical recording/reproducing system according to claim 4, wherein said vibration plate is vibrated mechanically by applying an alternate voltage to the vibration plate.

6. An optical recording/reproducing system according to claim 4, wherein said vibration plate is a crystal, the refraction index of which vibrates according to an applied alternate voltage.

* * * * *